United States Patent
Puharinen et al.

(10) Patent No.: US 7,149,307 B2
(45) Date of Patent: Dec. 12, 2006

(54) LOCKING ARRANGEMENT FOR A SUBSCRIBER TERMINAL DEVICE

(75) Inventors: Marko Puharinen, Kuopio (FI); Timo Remes, Oulu (FI); Jari Sundvall, Kuopio (FI); Juhana Tuomala, Oulu (FI); Harri Turunen, Kuopio (FI)

(73) Assignee: Flextronics ODM Luxembourg SA, Luxembourg, Zweigniederlassung Schweiz, Zug (CH)

( * ) Notice: Subject to any disclaimer, the term of this patent is extended or adjusted under 35 U.S.C. 154(b) by 374 days.

(21) Appl. No.: 10/187,436

(22) Filed: Jul. 2, 2002

(65) Prior Publication Data

US 2003/0012369 A1    Jan. 16, 2003

(30) Foreign Application Priority Data

Jul. 2, 2001    (FI) .................................. 20011442

(51) Int. Cl.
*H04M 1/00* (2006.01)
*H04M 9/00* (2006.01)

(52) U.S. Cl. .................................. 379/445; 379/433.09

(58) Field of Classification Search ........... 379/433.09, 379/433.08, 433.01, 445; 455/90.1, 90.3; 235/492; 234/492
See application file for complete search history.

(56) References Cited

U.S. PATENT DOCUMENTS 5,586,184 A    12/1996  Piper
5,604,050 A    2/1997   Brunette et al.
5,831,256 A    11/1998  De Larminat et al.
2002/0064023 A1  5/2002  Akagi et al.

FOREIGN PATENT DOCUMENTS

| EP | 0 892 447 A1 | 1/1999 |
| EP | 0 924 867 | 6/1999 |
| EP | 0 924 867 A2 | 6/1999 |
| WO | WO 01/63547 A2 | 8/2001 |

*Primary Examiner*—William J. Deane, Jr.
(74) *Attorney, Agent, or Firm*—Squire, Sanders & Dempsey L.L.P.

(57) ABSTRACT

The present invention relates to a locking arrangement for a terminal device of a telecommunication system. To improve the operating reliability of the terminal device, the attachment and locking of the structural elements changeable by the user to the rest of the device structure is improved by a locking device which consists of a solid piece (100) to be fitted into the terminal device in the different places of the frame part of which one has formed separate spring-like locking elements, each of which functions as a locking device of some structural element of this kind of the terminal device. The first spring-like locking element (20) may e.g. be adapted to lock the accumulator of the terminal device to the accumulator space reserved for it, and the second locking element (40) to lock the smart card of the terminal device to the space reserved for it in the terminal device. In the same locking piece there may also be locking elements (30, 31) for locking the accumulator cover in place.

15 Claims, 4 Drawing Sheets

LOCKING ARRANGEMENT FOR A SUBSCRIBER TERMINAL DEVICE

TECHNICAL FIELD OF THE INVENTION

The invention relates to attachment of specific components of a terminal device, particularly a subscriber terminal device such as a mobile station. More particularly, the objective of the invention is to improve the attachment of the components of the device, changeable by the user, to the rest of the device structure so that one may achieve an operating reliability and ease of use as good as possible in this respect.

BACKGROUND OF THE INVENTION

In mobile stations, e.g. in mobile phones, for user identification, a smart card provided with a processor, a so-called SIM card (SIM=Subscriber Identity Module) is used, to which it is possible to store e.g. user-specific information. In the terminal device there is a card compartment for the smart card, from which the smart card can be removed when necessary. In the card compartment there are separate connectors against which the connector interfaces on the card settle for transferring information between the processor and the other components of the terminal device.

When the smart card has been inserted into the terminal device, it is usually locked by some means so that it could not move in its compartment. If the locking is not sufficient, the card can move in its compartment, in which case the connector interfaces on it do not necessarily touch the connectors in the compartment any more. Thereby, there may occur problems in the transfer of information between the processor and the device.

For example in mobile phones, a chargeable battery in other words accumulator is used as the current supply, for which there is a place of its own in the device structure from which the accumulator can be removed when necessary. When the accumulator has been mounted and attached in place to the device, the attachment and locking of the accumulator has to be such that it is allowed to move as little as possible in the place reserved for it. In practice, the locking methods of accumulator have, however, not always been sufficient, but the accumulator may have moved in its place, in which case the current supply of the device may have been disturbed.

A mobile phone may also comprise a separate cover for closing the accumulator place. Additional tasks of the accumulator cover may include pressing the accumulator against the device structure in order that the poles of the accumulator would keep all the time in touch with the connector interfaces corresponding to them. It is, however, possible that there is a little clearance left in between the cover and the device structure, in which case the cover does not press the accumulator with a sufficient force. If the accumulator, due to a clearance, moves too much, also the accumulator may move, which causes disturbances in the current supply of the device.

The goal of the invention is to avoid the above-mentioned problems and to achieve a solution which enables one to get the attachment and locking of a smart card, accumulator and possible accumulator cover to the terminal device more dependable than before and thus also the operating reliability of the device better than before.

SUMMARY OF THE PRESENT INVENTION

The objective of the invention is to improve the attachment and locking of the structural elements, changeable by the user, disposed in terminal devices, such as mobile stations, to the rest of the device structure. More particularly, the objective of the invention is to improve the attachment of the components in question so that the clearances created between them and the rest of the device structure cannot cause disturbances or problems in the operation of the device, the removing and attachment of the components in question being, however, as easy as possible to accomplish.

The present invention provides a locking arrangement in a terminal device of a telecommunication system, and respectively a locking piece for a terminal device of a telecommunication system, which terminal device comprises several such structural elements that the user may remove from the terminal device and attach back to the terminal device.

According to a first aspect of the present invention there is provided a locking arrangement in a terminal device of a telecommunication system which comprises several such structural elements that the user may remove from the terminal device and attach back to the terminal device, which structural elements comprise at least an accumulator and a smart card, in which case the terminal device comprises an accumulator space and a smart card compartment for the smart card, in which arrangement the terminal device includes a solid locking piece to be attached to the frame of the terminal device in the frame part of which one has formed at least two spring-like locking elements that are functionally separate, so that the locking piece being in the terminal device, each locking element is adapted to lock a specific structural element of the aforementioned structural elements.

Preferably, in the frame part one has formed locking elements of the accumulator that penetrate into the accumulator space while it is empty, in which case the accumulator being put in place presses them together, and smart card locking elements which extend at least partly across the card compartment, allowing the smart card to be inserted underneath them.

Preferably, the aforementioned structural elements comprise, in addition, an accumulator cover for closing the accumulator space, in which in the frame part one has formed, in addition, locking elements of the smart card that extend at least partly across the card compartment in such a manner that the smart card can be inserted beneath them, and locking elements of the accumulator cover that have been fitted into the frame part so that the accumulator being put in place is subjected to a spring force that presses the accumulator cover away from the frame of the terminal device.

Preferably, the aforementioned structural elements comprise, in addition, an accumulator cover for closing the accumulator space, in which in the frame part one has formed, in addition, locking elements of the smart card that extend at least partly across the card compartment in such a manner that the smart card can be inserted beneath them, and locking elements of the accumulator cover that have been fitted into the frame part so that the accumulator being put in place is subjected to a spring force that presses the accumulator cover away from the frame of the terminal device.

Preferably, the aforementioned structural elements comprise, in addition, an accumulator cover for closing the accumulator space, in which in the frame part one has formed locking elements of the accumulator, which penetrate into the accumulator space while it is empty, in which case the accumulator being put in place presses them together, and locking elements of the accumulator cover that have been fitted into the frame part so the accumulator being put in place is subjected to a spring force that presses the accumulator cover away from the frame of the terminal device.

Preferably, the locking piece consists of a thin metal piece in the different places of the frame part of which one has formed the aforementioned spring-like locking elements.

Preferably, the locking elements of the accumulator comprise an arched protruding part protruding from the frame part of the locking piece that presses the accumulator being put in place in the accumulator space against a wall of the accumulator space.

Preferably, the locking elements of the smart card comprise a planar protruding part protruding from the frame part that at its free end is attached to the frame of the terminal device so that the planar surface of the protruding part is pressed against the surface of the smart card being put in place.

Preferably, the locking elements of the accumulator cover comprise, at the opposite ends of the frame part, locking tongues, which penetrate into the space reserved for the accumulator cover and are pressed together, when the accumulator cover is placed into the terminal device.

According to a first aspect of the present invention there is provided a locking piece for a terminal device of a telecommunication system, which terminal device comprises several such structural elements that the user may remove from the terminal device and attach back to the terminal device, which locking piece comprises a frame part and spring-like locking elements in it, in which in that the locking piece consists of a solid piece to be fitted into the terminal device in the different places of the frame part of which one has formed at least two spring-like locking elements which are functionally separate, so that the locking piece being in the terminal device, each locking element is adapted to lock a specific structural element of the aforementioned structural elements, in which case there are in the frame part spring-like locking means for at least two structural elements from a set which comprises an accumulator, accumulator cover and a smart card. Preferably, the locking piece consists of a thin metal piece.

The invention is based on that the terminal device comprises a solid locking piece preferably made of metal the different parts of which function as spring-like locking devices which lock the structural elements of the terminal device that are removable by the user. These structural elements include e.g. a smart card and accumulator, which are usually in all mobile stations. In the same locking piece there are thus integrated several spring-like locking devices, functionally separate, by means of which the attachment/ locking of the components in question may be accomplished. The locking piece thus enables one to eliminate the above described disadvantages that are caused by the too excessive clearances created in the manufacture phase of the cover structure of the device or brought about by abrasion caused by use. By means of the locking device it is thus possible to improve the operating reliability of the terminal device.

For devices provided with an accumulator cover it is advantageous that in the same locking piece there are locking parts also for locking the accumulator cover so that the locking piece at the same time eliminates the possible problems that might be due to too big a clearance between the accumulator cover and the rest of the device on the one hand, and on the other hand between the accumulator and the accumulator cover. The same locking piece, which is a kind of a combination spring as its functioning is concerned, can thus be used to lock in the terminal device at least three such structural elements that are changeable by the user.

The locking piece is in respect of its structure such that the locking of different structural elements can be made very durable. The structure, place of location and position of the locking device in the place of location may also be made such that the locking of the aforementioned structural elements is very easy to accomplish. This means basically that the locking of the components requires of the user only a little force.

Although the locking of different components is easy to accomplish, the accomplished locking does not, however, easily open, in case the device is subjected e.g. to blows. Instead, it is easy for the user to open the accomplished locking himself/herself when he or she so wishes.

Since the locking piece may be made of metal, it is mechanically durable and cost-effective to manufacture. The locking piece may also be manufactured such that its spring forces (locking forces) are relatively big.

BRIEF DESCRIPTION OF THE DRAWINGS

For a better understanding of the present invention and in order to show how the same may be carried into effect reference will now be made to the accompanying drawings, in which.

DETAILED DESCRIPTION OF CERTAIN EMBODIMENTS

Figure 1:
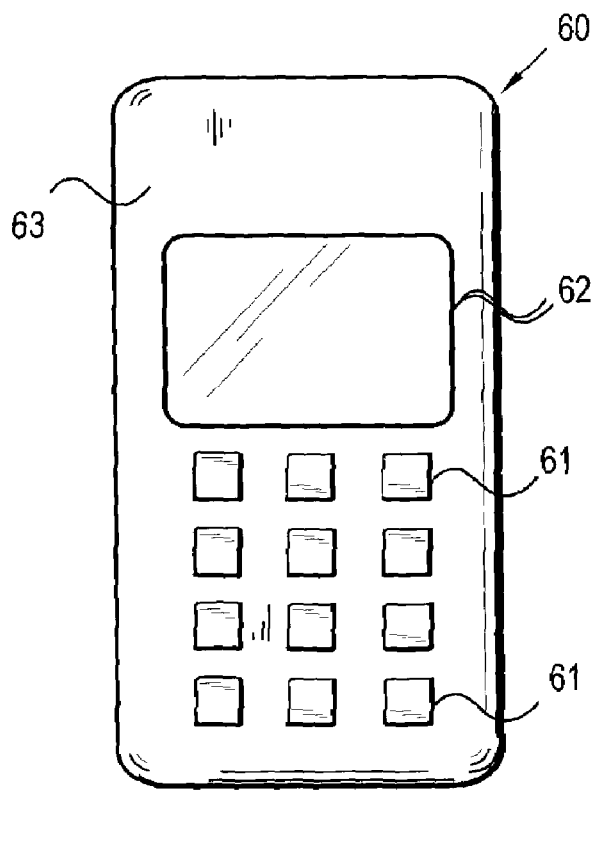
FIG. 1 represents a subscriber terminal device as seen from the front.

FIG. 1 represents a typical subscriber terminal device as seen from the front. The subscriber terminal device as seen in the figure is a mobile phone 60, which comprises among other things keys 61 and a display 62. Of the cover or enclosure structure of the terminal device, one can see in the figure the front cover, i.e. a so-called A cover 63. The cover structure may be e.g. plastic, fiberglass or metal.

Figure 2:
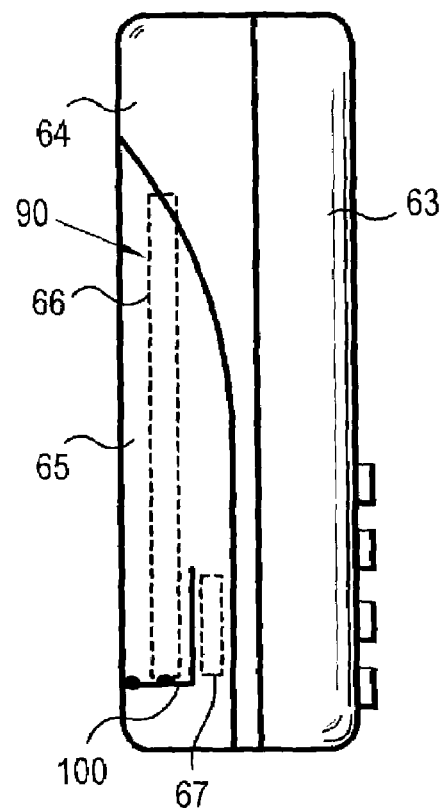
FIG. 2 represents a subscriber terminal device as seen from the side.

FIG. 2 shows the subscriber terminal device as seen from the side, in which case the cover structure can be better seen. In addition to the front cover, the subscriber terminal device comprises a rear part, i.e. a so-called B cover 64, in which one has formed an accumulator space 90 for the accumulator 66. The presented subscriber terminal device comprises, in addition, an accumulator cover 65 for closing the accumulator space 90. The accumulator space is thus formed in between the B cover and the accumulator cover. In addition, the subscriber terminal device comprises, for the smart card, i.e. in practice for the SIM card, a compartment 67, which in this implementation mode is in the part of the device that is on the side of the rear cover 64. In a typical terminal device, the aforementioned components, i.e. accumulator, smart card and possible accumulator cover are the parts that the user has to remove and attach back to the device.

In FIG. 2, one can further see that the subscriber terminal device further comprises a locking piece 100, which is at least partly between the accumulator space 66 and the card compartment 67. When the accumulator is in place in the accumulator space and when the smart card is in place in its own compartment, the locking piece locks (as will be presented later) the smart card in the card compartment 67 and the accumulator in the accumulator space 90, in which case neither of them can move in its own place. When the accumulator space is closed with an accumulator cover 65, the locking device also holds the accumulator cover in place, in which case it cannot open by mistake.

If in the device structure, there is too much clearance e.g. between the accumulator cover 65 and the rear cover 64, in which case the accumulator cover 65 could open by itself, this kind of opening is avoided, when the locking piece 100 has been placed into the device. The locking piece comprises several spring-like structural elements, each of which presses the different components of the device to the desired directions, in which case the possible clearances cannot cause problems. In addition, by means of the spring-like, elastic structure of the locking piece 100, each desired component can be locked in its own place.

Figure 3:
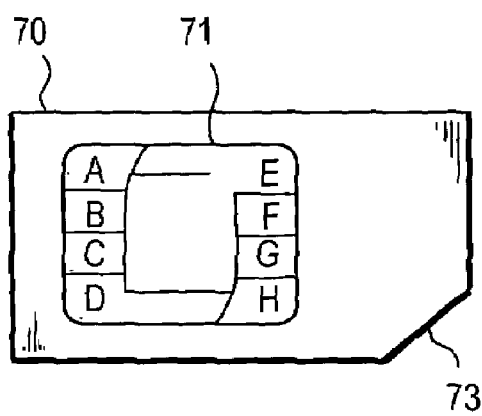
FIG. 3 represents a smart card to be inserted into the device as seen from above.

FIG. 3 represents a smart card 70 as seen from the so-called contact side, in which case one can see that the card comprises a metal plated connector interface area 71. The area comprises eight separate connector interfaces, which in the figure are denoted by letters A, B, C, D, E, F, G and H. In the smart card there is a so-called cut corner 73 by means of which one makes sure that the card is inserted the right side up into the card compartment, in which there is also a similar cut corner.

Figure 4:
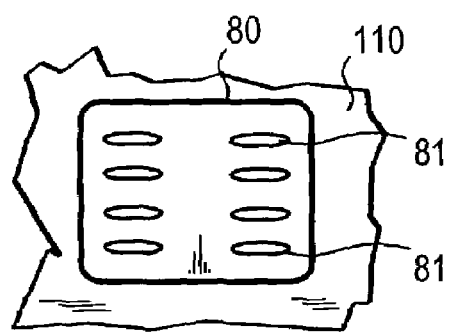
FIG. 4 represents a connector for the smart card of the device.

FIG. 4 represents a connector 80 designed for the smart card 70 that in practice is attached to a circuit board 110 disposed in the terminal device. The connector 80 comprises contacts 81, of which each settles against a predetermined connector interface of the smart card, when the smart card is inserted into the terminal device.

Figure 5:
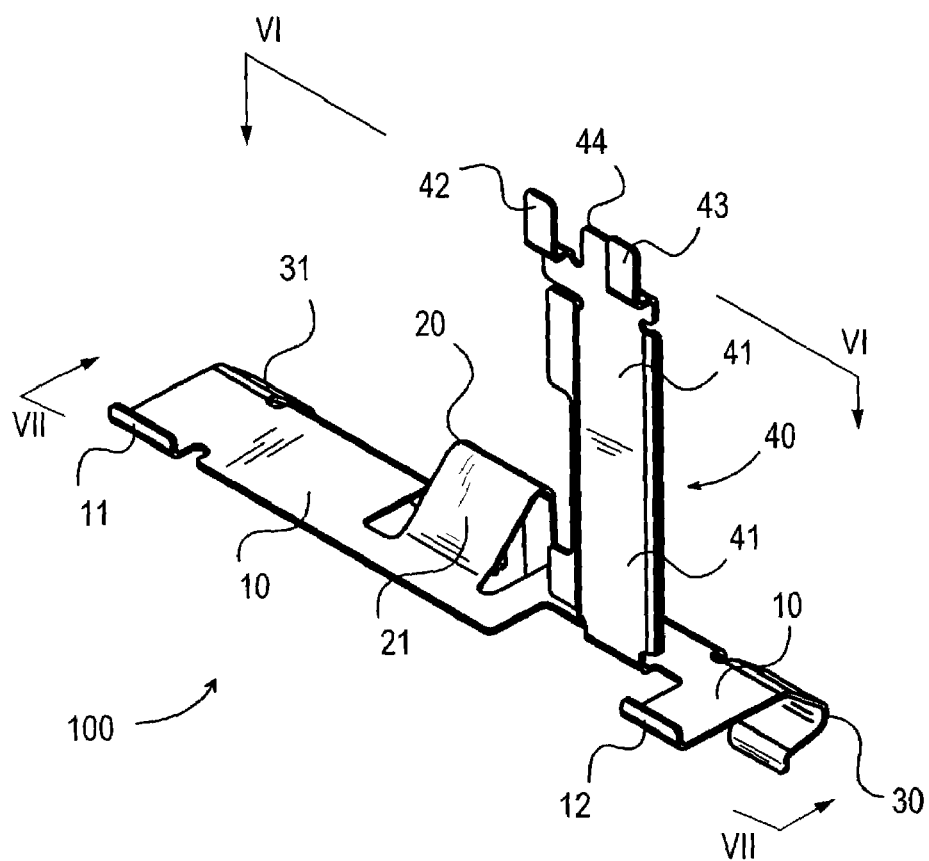
FIG. 5 is a perspective view illustrating a locking piece in accordance with the invention.

FIG. 5 is a perspective view illustrating one implementation mode of the locking piece 100. In the figure, the structure and shape of the locking device can be seen. The locking device is a solid piece that has been preferably made of metal the material thickness of which is preferably less than 1 mm. The locking piece comprises a substantially planar frame part 10, in which there is formed a locking protruding part 20 of the accumulator that is length-wise substantially in the middle of the frame part, a protruding part 40 protruding substantially perpendicularly from the plane of the frame part that functions as a spring structure pressing the smart card, as well as for the accumulator cover, locking tongues 30 and 31, which are disposed at the opposite ends of the frame part.

The locking protruding part 20 of the accumulator is raised obliquely upwards from the plane of the frame part, thus comprising a surface 21, which is advantageously at an angle of inclination of about 45 degrees with respect to the plane of the frame part 10. The surface 21 is directed away from the plane surface of the frame part from the same side as the protruding part 40. The other end of the locking protruding part 20 is free, and is bent back towards the frame part so that the free end is substantially perpendicular with respect to the plane of the frame part. At the free end there is a cavity 24, better seen in FIG. 7, which is formed in between branches 22 and 23 disposed at the free end.

The protruding part 40 is directed substantially at a right angle away from the plane surface of the frame part. The planar part 41 of the protruding part is substantially parallel with the longitudinal axis of the frame part. The first end of the protruding part is one-piece with the frame part, and the second end is free. At its free end the protruding part has three protruding part branches 42, 43, 44, of which branches 42 and 43 are the outermost ones and in the same plane with one another, whereas the middlemost branch 44 is in the same plane with the planar part 41 of the protruding part. There is a gap left in between the branches disposed in a different plane, which is pushed into a place adapted to the measures of the gap in the frame of the subscriber terminal device. The planar part 41 settles in that case against the surface of the smart card, when the locking piece and smart card are in place in the terminal device.

In addition, at the first end of the frame part of the locking piece 100 there is a first locking tongue 31 of the accumulator cover, and at the second end of the frame part there is a second locking tongue 30 of the accumulator cover. The locking tongues are in the lateral direction on the same side of the frame part, and form arched springs. In this implementation mode, the locking tongues are similar in respect of their structure and size. Since the locking tongues are arched and since the second end of each is free, they can function as local springs in the locking piece.

The frame part comprises at its first end a shoulder 11, and at its second end a similar shoulder 12. The shoulders enable one to prevent the locking device from moving in the subscriber terminal structure. In this implementation mode, the distance of each free end from the plane surface of the frame part is equal. When the locking piece 100 is in place in the terminal device, the shoulders settle against the frame structure of the inner part of the terminal device.

Figure 6:
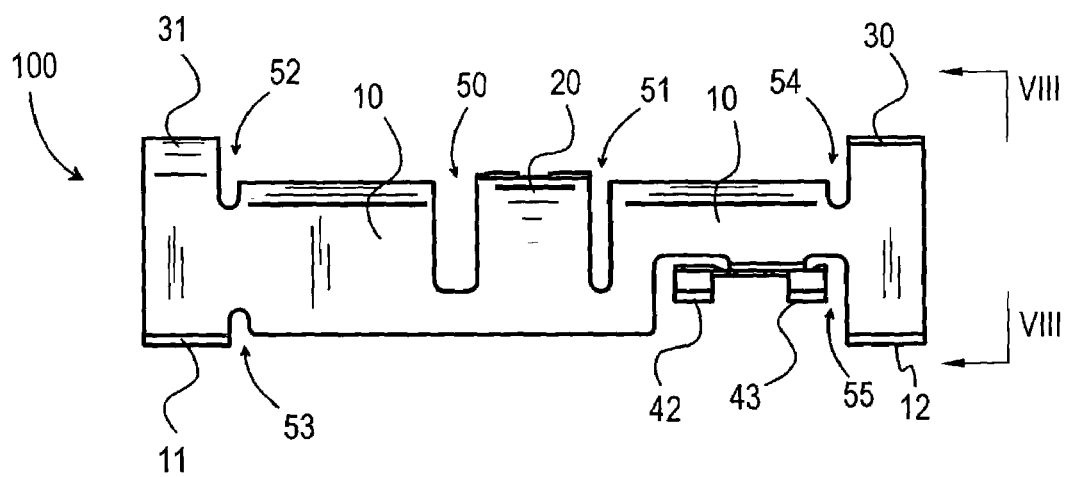
FIG. 6 represents the locking piece as seen from the direction of line VI—VI of FIG. 5.

FIG. 6 represents a locking piece 100 as seen from above, i.e. as seen from the direction of line VI—VI of FIG. 5. In FIG. 6 it can be seen that the locking piece comprises in the frame part slots 50 and 51 on each side of the locking protruding part 20 of the accumulator. The slots are in the junction of the locking protruding part and the frame part. Thanks to the slots, the locking protruding part can be made a spring-like part with respect to the frame part that can, when pressing, move against the plane surface of the frame part substantially in a perpendicular direction.

In FIG. 6 one can further see that the locking piece 100 comprises in the frame part slots 52, 53, 54 and 55. More particularly, slot 52 is disposed in the junction of the locking tongue 31 of the accumulator cover and of the frame part. Correspondingly, slot 54 is disposed in the junction of the locking tongue 30 and the frame part. Slot 53 is in the base part of the shoulder 11, so it is located on the opposite side of the frame part with respect to slot 52. Slot 55 is in turn in the base part of the shoulder 12, so it is located on the opposite side of the frame part with respect to slot 54. Slots 52 and 54 are basically cut-outs made due to technical reasons in the manufacture, but they also improve the elasticity of the frame part and further the fitting of the frame part into the space reserved for it in the terminal device.

Figure 7:
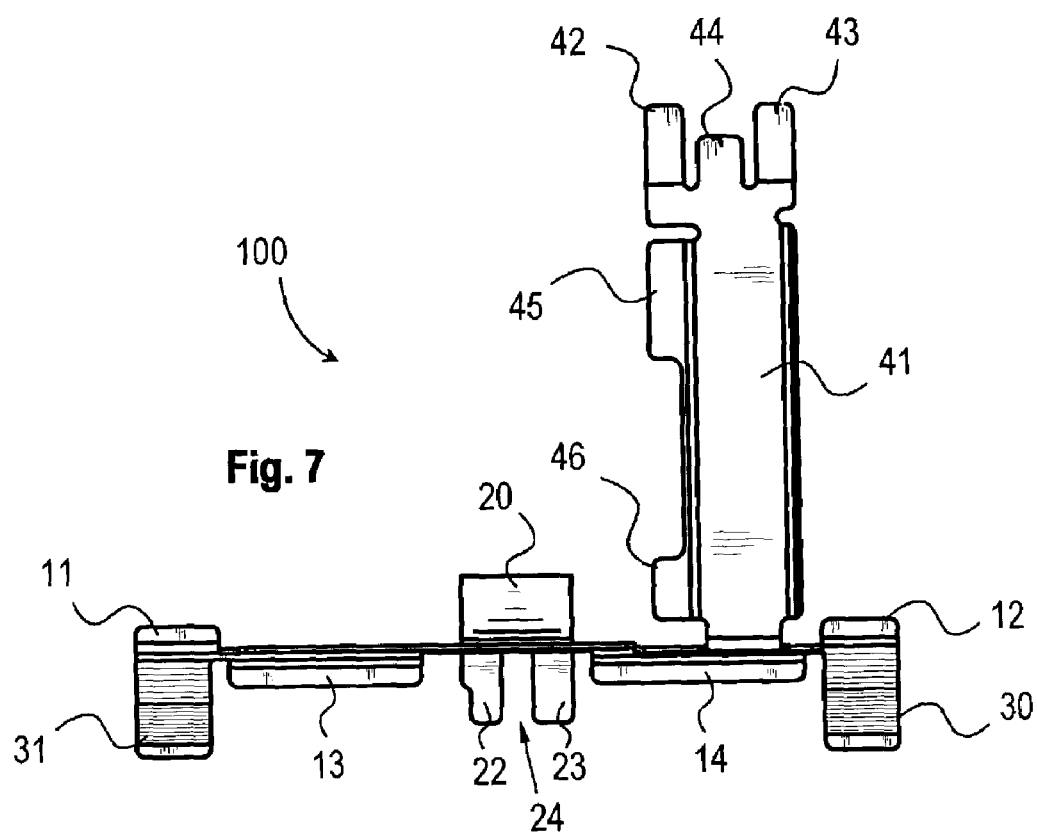
FIG. 7 represents the locking piece as seen from the direction of line VII—VII of FIG. 6.

FIG. 7 represents the locking piece as seen directly from the front, i.e. from the direction of line VII—VII of FIG. 5.

In the figure it can be seen that in the frame part there are, in addition, shoulders 13 and 14, which are on both sides of the locking protruding part 20 of the accumulator, and are directed substantially perpendicularly away from the frame part. The shoulders 13 and 14 are on the longer edge of the frame part, which is an opposite edge to that edge of the frame part on which there are the shoulders 11 and 12. Shoulders 13 and 14 settle against the frame structure of the inner part of the subscriber terminal device, in which case they, for their own part, as well as the shoulders 11 and 12, hold the locking piece in place and in the desired position in the subscriber terminal device.

FIG. 7 shows also the structure of the free end of the locking protruding part 20. Due to the cavity 24/branches 22 and 23, the locking protruding part has been made more elastic than before at its free end. An accumulator to be placed into a terminal device comprises a groove for the locking protruding part 20. When the user places the accumulator into the terminal device, he or she presses the locking protruding part with the accumulator, in which case the ends of the branches 22 and 23 are parted a little from the plane surface of the frame part. When the accumulator is in place, the spring force of the locking protruding part presses the accumulator, keeping the accumulator immovable in its space.

In FIG. 7 it can be further seen that the distance of the free end of each shoulder 13 and 14 is substantially equal. In addition, it can be seen that the free ends of the branches 22 and 23 are substantially equally far off from the plane of the frame part. The free ends of the branches are, however, more far off from the plane of the frame part than the free ends of the shoulders 13 and 14. In the figure it can also be seen that the locking tongues 30 and 31 for the accumulator cover are substantially equally far off from the plane of the frame part, and that in the second side edge of the protruding part 40 there are formed widenings 45 and 46 that increase the surface of the protruding part that is pressed against the smart card. This allows the clamping force to be distributed more evenly, and the smart card to stay better in place. In addition, the widenings make it more difficult to insert the smart card the wrong side up.

Figure 8:
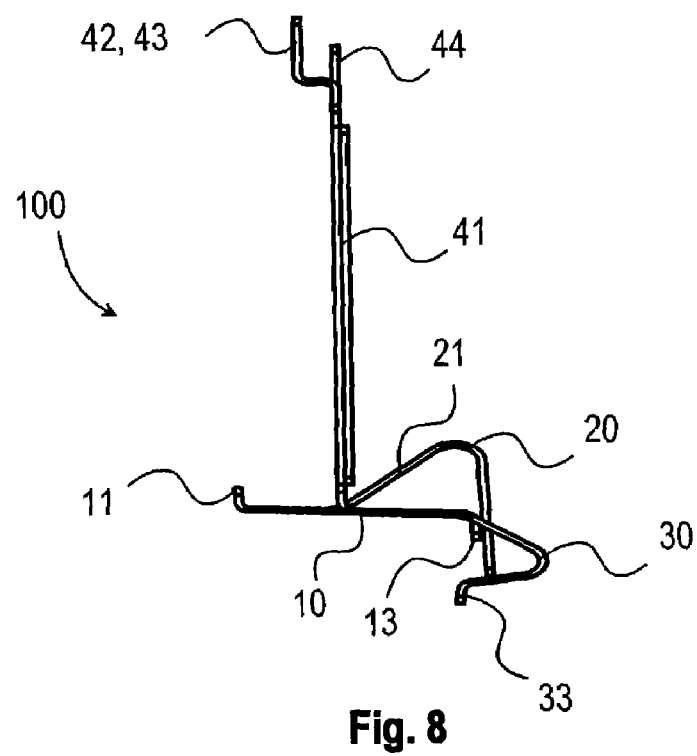
FIG. 8 represents the locking piece as seen from the direction of line VIII—VIII of FIG. 6.

FIG. 8 represents the locking piece as seen from the side, i.e. from the direction of line VII—VIII of FIG. 6. In FIG. 8, the shape of both the locking protruding part 20 and the locking tongue 30 of the accumulator can be clearly seen. In FIG. 8 one can also see that the locking protruding part 20 of the accumulator is, as seen from the side, arched in the middle as its shape is concerned. In this implementation alternative, the arch forms an angle the size of little less than a right angle. In the protruding part 20 between the arched portion and the free end there is a planar surface, which is directed substantially perpendicularly against the plane surface of the frame part 10.

Also the locking tongue 30 is arched in respect of its shape. The bending in the tongue forms an angle of about 45 degrees. Between the bending point and the free end, the tongue is, for its most part, planar, and is directed substantially towards the plane surface of the frame. The tongues 30 and 31 comprise in their free end a shoulder 33, which is directed substantially perpendicularly with respect to the plane of the frame part 10.

Figure 9:
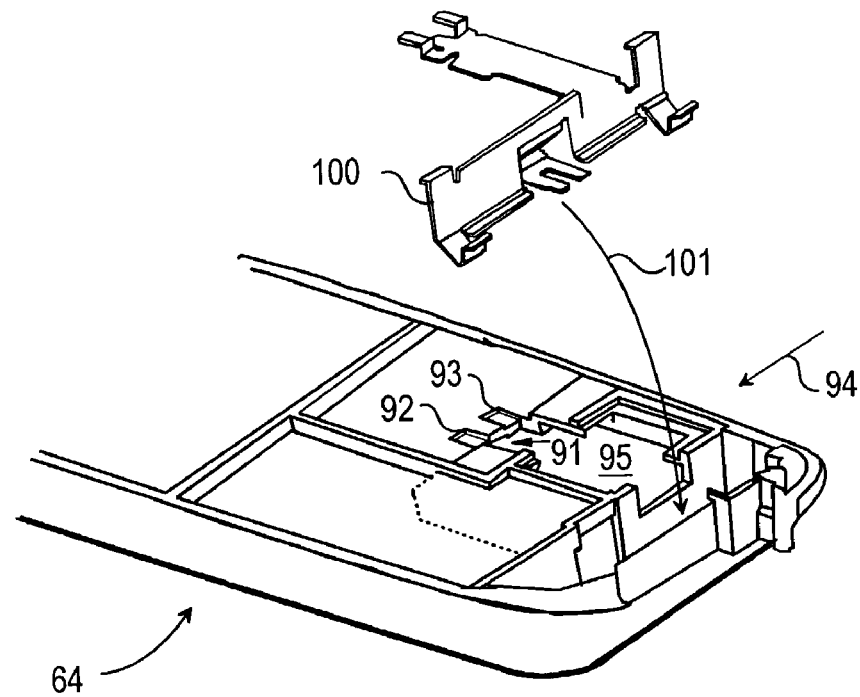
FIG. 9 illustrates the placing of the locking piece into the terminal device.
Figure 10:
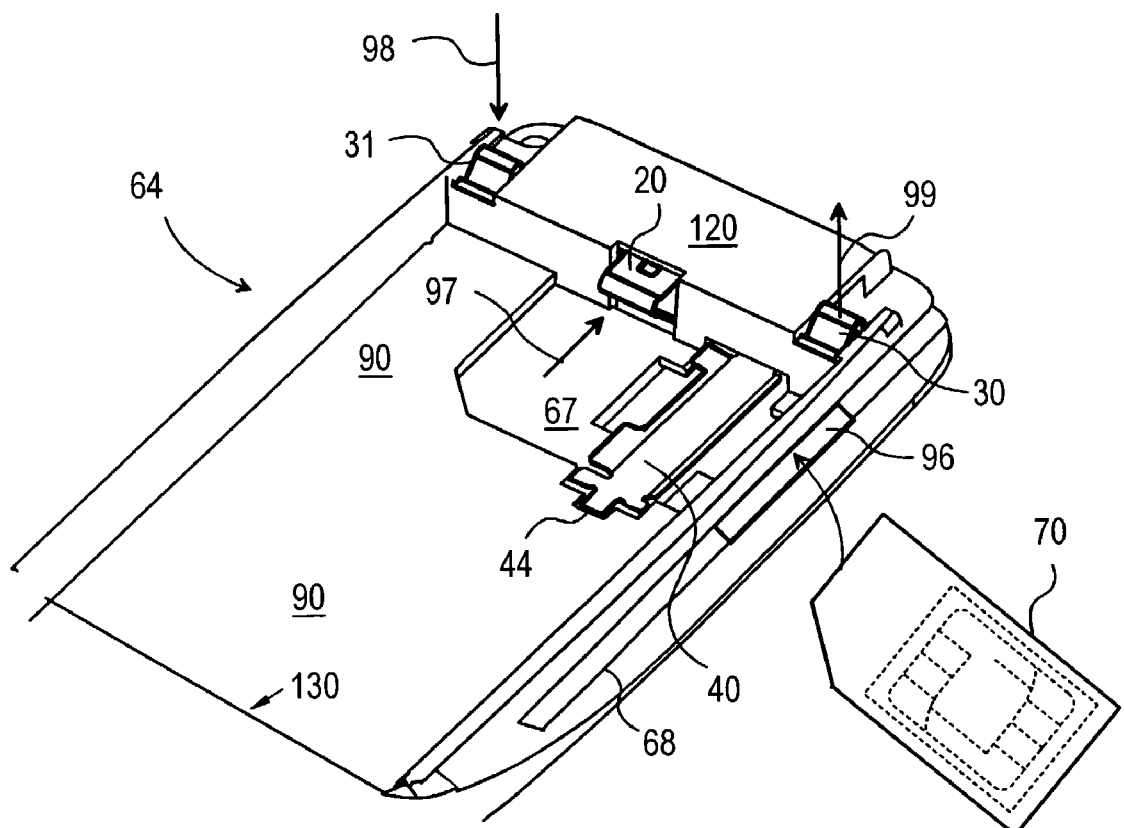
FIG. 10 illustrates a locking device and smart card disposed in a terminal device.

FIGS. 9 and 10 illustrate the functioning of the locking piece in the terminal device. Both figures represent the B cover, though seen from different sides. FIG. 9 represents the B cover as seen from the radio shielding side, and FIG. 10 as seen from the side of the accumulator space. On the radio shielding side, the surface of the B cover is, for its most part, coated with a material comprising metal. The circuit board 110 (not shown in FIGS. 9 and 10) of the device is in practice set against this surface so that its component side is against the radio shielding space. In that case the connector 80 (FIG. 4) on the circuit board settles beside an aperture 95 disposed in the B cover so that the connector poles settle so as to form the bottom of the smart card compartment 67 (FIG. 10). The planar part 120 of the B cover as seen in FIG. 10 forms, as seen from the other side of the B cover (i.e. the radio shielding side), that part of the cover against which the shoulders 13 and 14 of the locking piece settle. In addition, against the inner surface of this part come the shoulders 22 and 23, which slide along the surface in question, when the accumulator is pushed in place.

In FIG. 9, the locking piece 100 is yet outside the cover. The locking piece is placed into the cover 64 from the radio shielding side, as shown by arrow 101. In the figure, the locking piece has not been shown in detail, since the purpose of the figure is to solely illustrate the position in which the locking piece is placed into the cover. The cover structure comprises the aforementioned aperture 95 via which the connector poles of the connector 80 disposed on the circuit board are brought into the smart card compartment.

For the locking piece, the cover 64 comprises slots 91–93, into which the branches at the end of the locking protruding part 40 settle, when the locking piece is put in place in the terminal device. In other words, the material thickness of the cover structure is near the slots such that in the aforementioned place it is possible to fit the branches 42–44 of the locking piece so that the cover material settles in the slot between the branches. FIG. 9 further shows an arrow 94, which illustrates the direction from which the smart card is inserted into the card compartment.

FIG. 10 represents the B cover 64 of a subscriber terminal device as seen from the accumulator space 90, i.e. from the opposite side with respect to FIG. 9. There is a locking piece 100 mounted in place in the presented subscriber terminal device. As can be seen from the figure, the cover 64 comprises a card compartment 67 for the smart card. The shapes of the edges of the card compartment 67 are adapted to correspond to the shapes of the edges of the smart card.

In FIG. 10 it can be clearly seen how the arched part of the locking protruding part 20 protrudes through an aperture in the cover structure into the accumulator space 90. When the accumulator is mounted in the accumulator space, it presses the arched part of the protruding part 20 inside the cover structure in the direction as shown by arrow 97. In other words, the protruding part 20 sinks inside the structure substantially in the direction of the plane of the bottom of the accumulator space. As was mentioned above, the branches 22 and 23 at the end of the protruding part slide along the inner surface of the planar part 120, when the accumulator is pushed in place. When the accumulator is in place, the protruding part 20 pushes the accumulator against an opposite wall 130 of the accumulator space, locking it in place in the accumulator space. As seen from the direction of FIG. 10, the accumulator is thus placed above the card compartment 67.

In FIG. 10 it can also be seen how the locking tongues 30 and 31, which there are two pieces in this implementation alternative of the locking device, extend outside the cover structure, into a space which is reserved for the accumulator cover 65. When the accumulator cover is put in place in the subscriber terminal device, the tongues in question sink at least to some extent inside the cover structure 64. In other words, the accumulator cover presses the spring-like tongues in the direction as shown by arrow 98. The cover 64 comprises on each outer edge a groove 68 for the accumulator cover 65. When the accumulator cover is in place in the subscriber terminal device, the tongues 30 and 31 touch the inner surface of the accumulator cover and raise the accumulator cover away in the direction as shown by arrow 99, in which case the accumulator cover is pressed against the upper edge of the groove, as seen in FIG. 10. Thus, if there is clearance between the accumulator cover and the B cover structure, the locking tongues 30 and 31 of the accumulator cover eliminate the problems possibly caused by clearance.

In FIG. 10 it can be further seen that the cover 64 comprises in the edge a hole 96 via which the smart card is inserted into its compartment. The hole 96 is near the card compartment, which allows the smart card to be easily inserted into its compartment. In order that the smart card can be attached to and locked in its compartment, the locking piece 100 has to be mounted in place.

In the implementation alternative of FIG. 10, the protruding part 40 extends across the card compartment 67 in the lateral direction. When the smart card is not yet in its compartment, there is a gap left in between the protruding part 40 and the card compartment that is a little bit narrower than the thickness of the smart card. When the smart card is inserted into its compartment, the protruding part yields a little bit at least at that end in which there are the branches of the protruding part. The smart card is thus left under the protruding part, in which case the protruding part is left pressing the smart card against the bottom of the card compartment, locking it in place.

Above one has presented a locking piece in accordance with an advantageous implementation mode of the invention, the locking piece having locking elements for locking the accumulator, smart card and the accumulator cover, which are those parts that the user, in present terminal devices, needs to remove and attach. The fact of how many functionally separate locking elements there are integrated for the locking piece preferably depends on how many parts of this kind there are in the terminal device. It is, however, possible to integrate for the locking piece only a part of the needed locking elements, and to implement the rest e.g. as separate locking elements. Therefore, the locking piece may also be implemented e.g. in such a manner that in it there are the parts needed for the locking of the accumulator cover (locking tongues 30 and 31) and the parts needed for the locking of the smart card (protruding part 40), but not the parts needed for the locking of the accumulator (locking protruding part 20), which may be separate parts with regard to the locking piece. Correspondingly, the locking piece may be implemented also in such a manner that in it there are the parts needed for the locking of the accumulator and the accumulator cover (locking tongues 30 and 31), but not the parts needed for the locking of the smart card, which may be separate parts with respect to the locking piece.

In addition to the locking piece in accordance with the invention, there may also be other locking elements in the device for locking in place the parts changeable by the user. For example, for the locking of the accumulator cover there may be separate locking components, in which case the locking piece functions primarily so as to remove the clearance. The accumulator may also be integrated into the cover, in which case one speaks about a so-called accumulator packet. In that case there is no separate cover in the device, but the accumulator packet forms part of the outer cover of the device. Also for the locking of the accumulator packet there may be separate locking components, in which case the locking protruding part 20 and/or locking tongues 30 and 31 function primarily so as to remove the clearance.

Although the invention has been described above with reference to the examples according to the accompanying drawings, it is understood that the invention is not limited to it, but can be modified without departing from the inventive idea as set forth by the accompanying claims. The shape and location of the spring-like elements in the frame part that are comprised in the locking piece may thus be modified e.g. according to the fact of what kind the frame structure of the terminal device is, and how the accumulator, card compartment and the possible accumulator cover are disposed in the frame structure. In the same way, the structure of the locking piece may be modified according to the fact of how it is connected to the frame structure. The implementation of the attachment has not been presented in detail in the accompanying drawings, because it may vary in many different ways, and is not substantial with regard to the invention. Substantial is that several aforementioned locking elements have been integrated for the same locking piece the locking of which to the frame structure may, however, vary. Also the structure of the locking elements themselves may vary. For example, the protruding part 40 does not necessarily have to be connected to the frame structure from its free end, if the clamping force of the protruding part is sufficient in any case.

The invention claimed is:

1. A locking arrangement in a terminal device of a telecommunication system (60) comprising:
    a plurality of structural elements that are removably attached to the terminal device wherein the structural elements include at least an accumulator (66) and a smart card (70);
    an accumulator space (90) for receiving the accumulator;
    a smart card compartment (67) for receiving the smart card; and
    a solid locking piece (100) to be attached to a frame of the terminal device, wherein a frame part (10) of the solid locking piece includes a plurality of functionally separate, compressible locking elements, and each of the locking elements are configured to secure a specific structural element of the plurality of structural elements,
    wherein the solid locking piece includes a plurality of accumulator cover locking elements (30, 31) so that when an accumulator cover is put in place, the accumulator cover is subjected to a spring force that presses the accumulator cover away from the frame of the terminal device.

2. A locking arrangement according to claim 1, wherein in the frame part comprises:
    a plurality of formed locking elements (20) that extend into the accumulator space when the accumulator space is empty, and when the accumulator is placed in the accumulator space, the formed locking elements are compressed; and
    smart card locking elements (40) which extend at least partly across the smart card compartment, allowing the smart card to be inserted beneath the smart card locking elements.

3. A locking arrangement according to claim 2, further comprising an accumulator cover (65) for covering the accumulator space, and the frame part further comprises a plurality of accumulator cover locking elements (30, 31), the accumulator cover locking elements are configured to subject the accumulator to a spring force that presses the accumulator cover away from the frame of the terminal device when the accumulator is placed in the accumulator space.

4. A locking arrangement according to claim 3, wherein the locking elements of the accumulator cover comprise locking tongues (30, 31) which penetrate into a space for receiving the accumulator cover wherein the locking tongues are pressed together when the accumulator cover is placed into the terminal device, and the locking tongues are located at opposite ends of the frame part (10).

5. A locking arrangement according to claim 1, further comprising:
   an accumulator cover (65) for closing the accumulator space, wherein the frame part further comprises, smart card locking elements (40) that extend at least partly across the smart card compartment such that the smart card can be inserted beneath the smart card locking elements, and locking elements (30, 31) of the accumulator cover that have been fitted into the frame part so that the accumulator being put in place is subjected to a spring force that presses the accumulator cover away from the frame of the terminal device.

6. A locking arrangement according to claim 5, wherein the smart card locking elements comprise a planar protruding part (40) protruding from the frame part (10) that at its free end is attached to the frame of the terminal device so that the planar surface of the protruding part is pressed against the surface of the smart card placed with the smart card compartment.

7. A locking arrangement according to claim 5, wherein the locking elements of the accumulator cover comprise, locking tongues (30, 31) which penetrate into a space for receiving the accumulator cover wherein the locking tongues are pressed together when the accumulator cover is placed into the terminal device, and the locking tongues are located at opposite ends of the frame part (10).

8. A locking arrangement according to claim 1, further comprising:
   an accumulator cover (65) for closing the accumulator space;
   the frame part further comprises a plurality of formed accumulator locking elements (20) which extends into the accumulator space while it is empty, and when the accumulator is placed in the accumulator space, the formed accumulator locking elements are compressed; and
   the frame part further comprises a plurality of locking elements (30, 31) of the accumulator cover such that the accumulator being put in place is subjected to a spring force that presses the accumulator cover away from the frame of the terminal device.

9. A locking arrangement according to claim 8, wherein the accumulator locking elements comprise an arched protruding part protruding from the frame part of the locking piece wherein the accumulator is pressed against a wall of the accumulator space when the accumulator is placed within the accumulator space.

10. A locking arrangement according to claim 8, wherein the locking elements of the accumulator cover comprise, locking tongues (30, 31) which penetrate into a space for receiving the accumulator cover wherein the locking tongues are pressed together when the accumulator cover is placed into the terminal device, and the locking tongues are located at opposite ends of the frame part (10).

11. A locking arrangement according to claim 1, wherein the locking elements consists of a thin metal piece.

12. A locking arrangement according to claim 1, wherein the accumulator locking elements comprise an arched protruding part (20) protruding from the frame part of the locking piece wherein when the accumulator is placed within the accumulator space the accumulator is pressed against a wall (130) of the accumulator space.

13. A locking arrangement according to claim 1, wherein the smart card locking elements comprise a planar protruding part (40) protruding from the frame part (10) and is attached to the frame of the terminal device so that the planar surface of the protruding part is pressed against the surface of the smart card placed with the smart card compartment.

14. A locking piece for a terminal device of a telecommunication system, wherein the terminal device comprises a plurality of structural elements that are removably attached to the terminal device, wherein the locking piece is attached to a frame of the terminal device, comprises a solid piece (10); and a plurality of functionally separate, compressible locking elements, wherein each locking element is configured to lock in place a specific structural element of the plurality of structural elements, and wherein the plurality of structural elements consists of at least two structural elements selected from a group comprising an accumulator, accumulator cover and a smart card;
   wherein the solid piece includes a plurality of accumulator cover locking elements (30, 31) so that an accumulator being put in place is subjected to a spring force that presses the accumulator cover away from the frame of the terminal device.

15. A locking piece according to claim 14, wherein the locking piece consists of a thin metal piece.

* * * * *